(12) United States Patent
Musha et al.

(10) Patent No.: US 10,760,211 B2
(45) Date of Patent: Sep. 1, 2020

(54) BRASS-PLATED STEEL WIRE FOR REINFORCING RUBBER ARTICLES

(71) Applicant: BRIDGESTONE CORPORATION, Tokyo (JP)

(72) Inventors: Shinichi Musha, Nasushiobara (JP); Yoshihiko Kanatomi, Kodaira (JP); Junichi Yamagishi, Higashimurayama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/301,581

(22) PCT Filed: Apr. 6, 2015

(86) PCT No.: PCT/JP2015/001931
§ 371 (c)(1),
(2) Date: Oct. 3, 2016

(87) PCT Pub. No.: WO2015/166631
PCT Pub. Date: Nov. 5, 2015

(65) Prior Publication Data
US 2017/0121904 A1    May 4, 2017

(30) Foreign Application Priority Data
Apr. 30, 2014   (JP) ................. 2014-094219

(51) Int. Cl.
*B32B 15/20* (2006.01)
*D07B 1/06* (2006.01)
*C22C 9/04* (2006.01)
*B60C 9/00* (2006.01)
*C08J 5/00* (2006.01)

(52) U.S. Cl.
CPC .......... *D07B 1/0666* (2013.01); *B60C 9/0007* (2013.01); *C08J 5/00* (2013.01); *C22C 9/04* (2013.01); *B60C 2009/0014* (2013.01); *C08J 2307/00* (2013.01); *D07B 2205/3089* (2013.01); *Y10T 428/12917* (2015.01)

(58) Field of Classification Search
None
See application file for complete search history.

(56) References Cited

U.S. PATENT DOCUMENTS

| 4,978,586 A * | 12/1990 | Chambaere ........... C23C 14/086 |
| | | 428/621 |
| 2003/0178117 A1 | 9/2003 | Oosawa et al. |
| 2012/0177944 A1* | 7/2012 | Toyosawa ............. B60C 9/0007 |
| | | 428/621 |
| 2017/0101736 A1* | 4/2017 | Musha ................. D07B 1/0666 |
| 2017/0121904 A1 | 5/2017 | Musha et al. |

FOREIGN PATENT DOCUMENTS

| CN | 102597365 A | 7/2012 |
| EP | 2 476 802 A1 | 7/2012 |
| EP | 3138956 A1 | 3/2017 |
| JP | 2004-068102 A | 3/2004 |
| JP | 2009-091691 A | 4/2009 |
| JP | 2009091691 * | 4/2009 ............... D07B 1/06 |
| JP | 2011-057075 A | 3/2011 |
| WO | 2011/030547 A1 | 3/2011 |
| WO | 2015/166631 A1 | 11/2015 |

OTHER PUBLICATIONS

International Search Report for PCT/JP2015/001931 dated Jun. 2, 2015 [PCT/ISA/210].
Written Opinion for PCT/JP2015/001931 dated Jun. 2, 2015 [PCT/ISA/237].
Communication dated Dec. 1, 2017 from the Canadian Intellectual Property Office in counterpart application No. 2,946,263.
Communication dated Mar. 19, 2018 from the State Intellectual Property Office of the P.R.C. In counterpart Application No. 201580023272.6.

* cited by examiner

*Primary Examiner* — Seth Dumbris
(74) *Attorney, Agent, or Firm* — Sughrue Mion, PLLC

(57) ABSTRACT

This disclosure is to provide a brass-plated steel wire for reinforcing a rubber article, which is capable of improving the initial adhesiveness, heat-resistant adhesiveness and initial adhesion rate. This disclosure is a brass-plated steel wire for reinforcing a rubber article, wherein: when measured with XPS (X-ray photoelectron spectroscopy), an outermost surface contains zinc at an amount of 4.8 atom % or less, phosphorus at an amount of 0.5 atom % or more, and oxygen at an amount of 50 atom % or less; and in the outermost surface, an atomic ratio of copper to zinc is 1 to 6.

6 Claims, No Drawings

BRASS-PLATED STEEL WIRE FOR REINFORCING RUBBER ARTICLES

CROSS REFERENCE TO RELATED APPLICATIONS

This application is a National Stage of International Application No. PCT/JP2015/001931 filed Apr. 6, 2015, claiming priority based on Japanese Patent Application No. 2014-094219 filed Apr. 30, 2014, the contents of all of which are incorporated herein by reference in their entirety.

TECHNICAL FIELD

This disclosure relates to a brass-plated steel wire for reinforcing a rubber article.

BACKGROUND

In rubber articles in which strength is particularly required, such as automobile tires, conveyor belts, hoses and the like, for the purpose of reinforcing a rubber and improving the strength and durability, used are steel cord-rubber composites, which are obtained by coating a metal reinforcing material, such as steel cord and the like, with a coating rubber. Here, in order to exhibit high reinforcing effect and obtain reliability in such a steel cord-rubber composite, a stable and strong adhesion is required between the coating rubber and the metal reinforcing material.

In order to obtain a steel cord-rubber composite exhibiting such high adhesion between the coating rubber and the metal reinforcing material, widely used is a method of embedding in a coating rubber compounded with sulfur a metal reinforcing material such as steel cords and the like plated with zinc, brass, etc., and simultaneously adhering the same with rubber vulcanization during heating vulcanization, i.e., direct vulcanization adhesion. Previously, in order to further improve the adhesion due to the direct vulcanization adhesion between the coating rubber and the metal reinforcing material, various studies have been performed regarding the direct vulcanization adhesion.

For example, PTL1 (JP2009-91691A) suggests a steel wire, in which a circumference of the steel wire is brass-plated, subjected to drawing process, and then a surface of the steel wire is washed in an aqueous solution containing a transition metal as a salt, and thereby the concentration of transition metals except for zinc and copper on the surface of the brass plating is set to 0.01 mass % or more.

CITATION LIST

Patent Literature

PTL1: JP2009-91691A

SUMMARY

Technical Problem

However, although the steel wire as disclosed in PTL 1 is regarded as having improved initial adhesiveness and heat-resistant adhesiveness with coating rubber, further improvement in the initial adhesiveness and heat-resistant adhesiveness has been required, and other than these performances, for example, improvement in initial adhesion rate is desired as well. Moreover, initial adhesiveness, heat-resistant adhesiveness and initial adhesion rate are affected as well by the oxygen amount of the surface of the steel wire, which, however, has not been sufficiently studied in the steel wire of PTL1.

Then, this disclosure is to provide a brass-plated steel wire for reinforcing a rubber article, which is capable of improving the initial adhesiveness, heat-resistant adhesiveness and initial adhesion rate.

Solution to Problem

In the brass-plated steel wire for reinforcing a rubber article of this disclosure, when measured with XPS (X-ray photoelectron spectroscopy), an outermost surface contains zinc at an amount of 4.8 atom % or less, phosphorus at an amount of 0.5 atom % or more, and oxygen at an amount of 50.0 atom % or less; and in the outermost surface, an atomic ratio of copper to zinc is 1 to 6. According to the brass-plated steel wire for reinforcing a rubber article of this disclosure, it is possible to improve the initial adhesiveness, heat-resistant adhesiveness and initial adhesion rate.

Here, in this disclosure, the "atom %" refers to a ratio of the number of specific atoms to the number of all atoms measured with XPS, and the "atomic ratio" refers to a ratio of atom numbers.

The brass-plated steel wire for reinforcing a rubber article of this disclosure preferably further contains a metal having an ionization tendency less than zinc and more than copper at an amount of 0.010 to 2.0 atom %. According to this aspect, it is possible to reduce a content of cobalt salts in a coating rubber of the steel wire, and thereby improve the durability of the coating rubber.

Advantageous Effect

According to this disclosure, it is possible to provide a brass-plated steel wire for reinforcing a rubber article, which is capable of improving the initial adhesiveness, heat-resistant adhesiveness and initial adhesion.

DETAILED DESCRIPTION

Hereinafter, this disclosure is described specifically based on its embodiments.

In the brass-plated steel wire for reinforcing a rubber article of this disclosure (hereinafter referred to "the steel wire" as well), when measured with XPS (X-ray photoelectron spectroscopy), an outermost surface contains zinc at an amount of 4.8 atom % or less, phosphorus at an amount of 0.5 atom % or more, and oxygen at an amount of 50.0 atom % or less; and in the outermost surface, an atomic ratio of copper to zinc is 1 to 6.

Here, in the present specification, the outermost surface of the brass-plated steel wire for reinforcing a rubber article refers to a region of which the thickness from a surface of such steel wire in its depth direction is measured with XPS (X-ray photoelectron spectroscopy), and more specifically, a thickness of about several nm corresponding to an emission depth of photoelectron generated when irradiating X-ray on a surface of the brass-plated steel wire for reinforcing a rubber article.

When the outermost surface of the brass-plated steel wire for reinforcing a rubber article of this disclosure is measured with the aforementioned XPS, the outermost surface of such steel wire contains zinc at an amount of 4.8 atom % or less, preferably 1.0 to 4.8 atom %, more preferably 2 to 4.8 atom %. When the amount of zinc is 4.8 atom % or less, it is possible to improve the initial adhesion rate between the steel wire and the rubber. Here, the lower limit of zinc content is not limited, but when it is 1 atom % or more, the adhesion rate would not be excessively high, and it is possible to prevent enlargement of the adhesion layer.

The outermost surface contains phosphorus at an amount of 0.5 atom % or more, preferably 0.5 to 5.0 atom %, and more preferably 0.5 to 3 atom %. By setting the amount of phosphorus to 0.5 atom % or more, liquation of the plating components to the rubber side during thermal aging tends to be suppressed, and thus it is possible to improve the heat-resistant adhesiveness between the steel wire and the rubber. Further, the upper limit of phosphorus content is not limited, but if 5.0 atom % or less, it is possible to maintain a necessary initial adhesion rate.

In the brass-plated steel wire for reinforcing a rubber article of this disclosure, an atomic ratio of copper to zinc in the aforementioned outermost surface is 1 to 6, preferably 1 to 4, and more preferably 1 to 3. When the brass-plated steel wire for reinforcing a rubber article contains zinc at an amount within the aforementioned range, it is possible to improve the initial adhesiveness, heat-resistant adhesiveness and initial adhesion rate. Specifically, when vulcanizing a steel wire and its coating rubber, since copper reacts with sulfur in the coating rubber and generates an adhesion layer formed of copper sulfides, if the atomic ratio of copper to zinc is 1 or more, copper exists effectively and the adhesion layer is generated effectively. Further, when the atomic ratio of copper to zinc is 6 or less, it is possible to prevent reduction in initial adhesiveness due to enlargement of the adhesion layer.

Then, in the brass-plated steel wire for reinforcing a rubber article of this disclosure, when measured with the aforementioned XPS, its outermost surface preferably further contains a metal having an ionization tendency less than zinc and more than copper at an amount of 0.010 to 2.0 atom %, more preferably 0.020 to 1.5 atom %, and even more preferably 0.050 to 1.0 atom %. By containing such metal, it is possible to reduce the content of cobalt salt in the coating rubber of the steel wire, and thus the durability of the coating rubber is improved. Moreover, if more than 2.0 atom %, no further improvement in the durability of the coating rubber is certified, and thus the upper limit of such metal is set to 2.0 atom %.

Further, cobalt salts compounded into the rubber composition of the tire are preferably reduced as possible. Specifically, although cobalt salts are ordinarily compounded into a rubber composition for a coating rubber as an adhesion promoter in order to improve the initial adhesiveness between the coating rubber and a metal reinforcing material during direct vulcanization adhesion used in tires, etc., the cobalt salts are preferably reduced as possible from the viewpoint of improvement in the durability against deterioration and crack growth, etc. of the coating rubber.

Here, the metal having an ionization tendency less than zinc and more than copper can be, for example, chromium (Cr), iron (Fe), cadmium (Cd), cobalt (Co), nickel (Ni), tin (Sn), lead (Pb), etc. Among the above, cobalt is preferable. Cobalt is ordinarily compounded to many coating rubbers as an adhesion promoter in order to achieve further improvement in adhesion. However, depending on the amount of cobalt contained in such coating rubber, cobalt tends to lead to reduction in durability of the coating rubber itself against heat, wet and oxidation. However, by containing such cobalt in a brass-plated steel wire for reinforcing a rubber article, it is possible to reduce the cobalt content in the coating rubber, effectively suppress deterioration in physical properties of the rubber, and simultaneously reduce the cost.

The aforementioned brass-plated steel wire for reinforcing a rubber article is manufactured with, for example, the following method. The circumference of the steel wire is brass-plated, and then subjected to drawing process. Compositions of such plating ordinarily contain copper by 70 mass % or less, preferably 60 to 65 mass %, and contains zinc by 30 mass % or more, preferably 35 to 40 mass %. It is possible to immerse the surface of the obtained steel wire in an aqueous solution containing as a metallic salt a metal having an ionization tendency less than zinc and more than copper, and then twist a plurality of these steel wires, or to twist a plurality of these steel wires to obtain steel cords, and then immerse the surfaces of the steel cords in an aqueous solution containing the aforementioned metallic salt.

Such metallic salt is not specifically limited as long as exhibiting a high solubility to water, and can be, for example, metal chlorides, metal carbonates, metal nitrates, metal sulfates, metal acetates, metal citrates, metal gluconates, acetylacetone metal salts, etc. Among the above, in order to achieve a preferable pH value mentioned above in an aqueous solution containing this metallic salt, metal acetates are preferable.

In the aqueous solution containing a metallic salt of a metal containing a metal having an ionization tendency less than zinc and more than copper, the concentration of the metallic salt is ordinarily 0.001 to 1 mol/L, preferably 0.005 to 0.5 mol/L, and more preferably 0.01 to 0.2 mol/L. The pH of the aqueous solution is 5 to 8, preferably 5.5 to 7.5, more preferably 6 to 7. By using an aqueous solution containing a metallic salt having a concentration and a pH value within the aforementioned range, there is not risk of negative influence to the brass plating, and simultaneously, it becomes possible to contain phosphorus, zinc and a metal having an ionization tendency less than zinc and more than copper by a predetermined amount in the outermost surface of the steel wire. Moreover, such pH value is preferable as well from the viewpoint considering the environment and the safety during manufacture.

The time for immersing the steel wire in an aqueous solution containing the aforementioned metallic salt can be set appropriately, but is ordinarily 0.05 to 30 seconds, preferably 0.1 to 20 seconds.

Furthermore, the content of zinc, phosphorus and the atomic ratio of copper to zinc in the aforementioned outermost surface of the brass-plated steel wire for reinforcing a rubber article can be controlled, for example, by adjusting the composition of the brass plating, alternatively, by adjusting the treatment (immersion) time with the aqueous solution and/or the pH of the aqueous solution. For example, by elongating the treatment time with the aqueous solution, or reducing the pH of the aqueous solution, it is possible to reduce the number of zinc atoms, and increase the atomic ratio of copper to zinc.

After subjecting the steel wire to immersion treatment in the aforementioned aqueous solution of a metallic salt, when the surface of the steel wire is activated, if the surfaces contacts oxygen in the air after the immersion treatment, there is a probability that the oxygen amount in the surface is increased and the activation is deteriorated due to oxidation reaction. In particular, when heating and drying the wire surface in the presence of oxygen, the aforementioned deterioration in activation becomes obvious. If the oxygen amount in the steel wire surface is more than 50 atom %, the adhesion reaction is inhibited, and thus the oxygen amount in the aforementioned outermost surface of the brass-plated steel wire for reinforcing a rubber article of this disclosure is 50 atom % or less.

Therefore, after being subjected to immersion treatment in the aforementioned aqueous solution containing a metallic salt, the steel wire is not subjected to drying by being heated to 45° C. or more.

The method for drying the steel wire after performing immersion treatment in the aforementioned aqueous solution containing a metallic salt can be performed, for example, by injecting compressed air onto the steel wire surface. Further, in order to prevent increase in the oxygen amount afterward, the steel wire is preferably stored in an environment of lower than 45° C.

Here, when the outermost surface of the aforementioned brass-plated steel wire for reinforcing a rubber article contains cobalt as a metal having an ionization tendency less than zinc and more than copper, an amount of cobalt to be compounded into the rubber composition for coating the aforementioned brass-plated steel wire for reinforcing a rubber article can be reduced. For example, it is possible to contain cobalt at an amount of 0.1 parts by mass or less per 100 parts by mass of a rubber component, or not to compound cobalt. In that case, it is possible to effectively suppress deterioration in physical properties of the coating rubber, and simultaneously reduce the cost. From such viewpoint, it is preferable that cobalt is not contained at all.

It is preferable to use in a tire a composite of the steel wire of this disclosure and the rubber composition coating the steel wire (steel wire-rubber composite) as a reinforcing member such as a carcass ply, a belt ply and the like. A structure of such a tire is not specifically limited, and well-known tire structure can be directly used. Here, the aforementioned steel wire-rubber composite is excellent in initial adhesiveness and heat-resistant adhesiveness, and thus it is particularly effective to use the aforementioned steel wire-rubber composite to an article having a high bending frequency such as tire.

EXAMPLES

Next, this disclosure is specifically described based on examples, but this disclosure is not limited to these Examples.

Example 1

A steel cord of 1×3 structure is produced by twisting steel wires plated with brass (Cu: 63 mass %, Zn: 37 mass %), and then, this steel cord is immersed for 10 seconds in an aqueous solution containing cobalt acetate by 0.1 mol/L (adjusted to pH 6.5 with acetic acid), removed of extra attached liquid with air blow, and afterward stored at normal temperature for 1.5 hours. A sample is produced by arranging the steel cords parallelly, coating with the rubber composition having a formulation shown in Table 1 in the upward and the downward directions, and performing vulcanization at the conditions according to Table 1. Regarding the sample, the initial adhesiveness, the heat-resistant adhesiveness, the initial adhesion rate, the aging property and the crack growth resistance are evaluated by using the following methods. The obtained evaluation results, and the results of the amounts (atom %) of phosphorus (P), zinc (Zn), oxygen (O) and cobalt (Co) and the atomic ratio (Cu/Zn) of copper to zinc, which are obtained by measuring the components of the outermost surface of the aforementioned immersed steel wire by using X-ray photoelectron spectroscopy (XPS, Quantera SXM, made by Ulvac-Phi., Inc.), are as shown in Table 1.

The measurement conditions with X-ray photoelectron spectroscopy are as following.

X-ray source: Monochromatized Al-Kα ray
Measurement region: 50 μmϕ
Measurement peak: C1s, O1s, N1s, P2p, Cu2p$_{2/3}$, Zn2p$_{2/3}$
Data treatment: Multipak (made by ULVAC-PHI, Inc.)
Quantitation: quantitated from the obtained peak area by using relative sensibility coefficient method
Cu/Zn is a ratio of quantitative values of Cu2p$_{2/3}$ and Zn2p$_{2/3}$.

Examples 2 to 5 and Comparative Examples 1 to 4

A sample is produced and evaluated in the same manner as in Example 1, except that each compounding amount is varied as shown in Table 1. The obtained results are as shown in Table 1. Further, regarding the zinc concentration and the atomic ratio of copper to zinc, for example, by elongating the treatment time with the aqueous solution or lowering the pH of the aqueous solution, the number of zinc atoms is reduced and Cu/Zn is increased.

Comparative Example 5

A sample is produced and evaluated in the same manner as in Example 1, except that the drying conditions, etc. after immersion treatment of the steel cord are varied as shown in Table 1. The obtained results are as shown in Table 1.

<Evaluation Method of Initial Adhesiveness>

After vulcanizing each sample at 160° C. for 7 minutes, according to ASTM-D-2229, the steel cord is pulled out from each sample, the coating state of the rubber is visually observed, and each sample is subjected to index evaluation with the rubber coverage of the sample of Comparative Example 1 as 100. A larger value represents an excellent initial adhesiveness.

<Evaluation Method of Heat-Resistant Adhesiveness>

After vulcanizing each sample at 160° C. for 20 minutes, and left standing the vulcanized samples under a nitrogen atmosphere at 110° C. for 30 days, according to ASTM-D-2229, the steel cord is pulled out from each sample, the coating state of the rubber is visually observed, and each sample is subjected to index evaluation with the rubber coverage of the sample of Comparative Example 1 as 100. A larger value represents an excellent heat-resistant adhesiveness.

<Evaluation Method of Aging Property of Rubber>

After vulcanizing the unvulcanized rubber at 160° C. for 20 minutes, and aging at 100° C. for 24 hours (thermal aging condition), by performing tensile test according to JIS K6251, Eb (elongation at break (%)) and Tb (tensile strength (MPa)) are measured, TF (toughness: Eb×Tb) after thermal aging is determined, and each sample is subjected to index evaluation with Comparative Example 1 as 100. A larger value represents excellent aging property of the rubber (i.e., unlikely to deteriorate under thermal aging condition).

<Evaluation Method of Crack Growth Resistance of Rubber>

Regarding each sample, constant stress fatigue test is performed by using a fatigue tester manufactured by Ueshima Seisakusho Co., Ltd., the number of times until fatigue is measured, and is represented with an index with Comparative Example 1 as 100. A larger value represents an excellent crack growth resistance.

TABLE 1

|  |  | Comparative Example 1 | Comparative Example 2 | Comparative Example 3 | Comparative Example 4 | Comparative Example 5 |
|---|---|---|---|---|---|---|
| Drying condition after immersion treatment of steel cord | | Stored at normal temperature after drying with compressed air | Stored at normal temperature after drying with compressed air | Stored at normal temperature after drying with compressed air | Stored at normal temperature after drying with compressed air | Dried for 1 minute at 50° C. |
| Steel cord | Outermost surface Cu/Zn ratio | 0.8 | 3.5 | 6.5 | 3.1 | 3.1 |
|  | Outermost surface Zn (atom %) | 4 | 6 | 4 | 3.4 | 3.6 |
|  | Outermost surface P (atom %) | 2.1 | 1.1 | 1 | 0.3 | 1.2 |
|  | Outermost surface O (atom %) | 40 | 34 | 32 | 32 | 58 |
| Rubber composition (parts by mass) | Natural rubber | 100 | 100 | 100 | 100 | 100 |
|  | HAF grade carbon black | 60 | 60 | 60 | 60 | 60 |
|  | Zinc white | 8 | 8 | 8 | 8 | 8 |
|  | Antioxidant *1 | 2 | 2 | 2 | 2 | 2 |
|  | Vulcanization accelerator *2 | 1 | 1 | 1 | 1 | 1 |
|  | Sulfur | 6 | 6 | 6 | 6 | 6 |
|  | Cobalt salt of fatty acid *3 | 1 | 1 | 1 | 1 | 1 |
| Initial adhesiveness (index) | | 100 | 100 | 105 | 105 | 92 |
| Heat-resistant adhesiveness (index) | | 100 | 100 | 90 | 98 | 98 |
| Deterioration property of rubber (TF after thermal aging of rubber (index)) | | 100 | 100 | 100 | 100 | 100 |
| Crack growth resistance of rubber (index) | | 100 | 100 | 100 | 100 | 100 |

|  |  | Example 1 | Example 2 | Example 3 | Example 4 | Example 5 |
|---|---|---|---|---|---|---|
| Drying condition after immersion treatment of steel cord | | Stored at normal temperature after drying with compressed air | Stored at normal temperature after drying with compressed air | Stored at normal temperature after drying with compressed air | Stored at normal temperature after drying with compressed air | Stored at normal temperature after drying with compressed air |
| Steel cord | Outermost surface Cu/Zn ratio | 1.6 | 2.6 | 3.2 | 5.2 | 3.2 |
|  | Outermost surface Zn (atom %) | 4 | 4.5 | 3.5 | 4.1 | 3.5 |
|  | Outermost surface P (atom %) | 1.5 | 1.5 | 1.3 | 1 | 1.3 |
|  | Outermost surface O (atom %) | 39 | 38 | 33 | 31 | 33 |
| Rubber composition (parts by mass) | Natural rubber | 100 | 100 | 100 | 100 | 100 |
|  | HAF grade carbon black | 60 | 60 | 60 | 60 | 60 |
|  | Zinc white | 8 | 8 | 8 | 8 | 8 |
|  | Antioxidant *1 | 2 | 2 | 2 | 2 | 2 |
|  | Vulcanization accelerator *2 | 1 | 1 | 1 | 1 | 1 |
|  | Sulfur | 6 | 6 | 6 | 6 | 6 |
|  | Cobalt salt of fatty acid *3 | 1 | 1 | 1 | 1 | 0 |
| Initial adhesiveness (index) | | 105 | 107 | 108 | 105 | 105 |
| Heat-resistant adhesiveness (index) | | 102 | 103 | 105 | 103 | 102 |
| Deterioration property of rubber (TF after thermal aging of rubber (index)) | | 100 | 100 | 100 | 100 | 115 |
| Crack growth resistance of rubber (index) | | 100 | 100 | 100 | 100 | 130 |

*1 Made by Ouchi Shinko Chemical Industrial Co., Ltd., Nocrac 6C, N-phenyl-N'-(1,3-dimethylbutyl)-p-phenylenediamine
*2 Made by Ouchi Shinko Chemical Industrial Co., Ltd., Nocceler DZ, N,N'-dicyclohexyl-2-benzothiazolylsulfenamide
*3 Made by OMG, Manobond C22.5, containing cobalt by 22.5 mass %

As clarified from the results in Table 1, it is understood that Examples 1 to 5, which use steel cords containing P, Zn and O at a specific amount and having a specific value of Cu/Zn as measured with XPS in the outermost surface, exhibit excellent initial adhesiveness, heat-resistant adhesiveness and initial adhesion rate, as compared to Comparative Examples 1 to 5.

INDUSTRIAL APPLICABILITY

According to this disclosure, it is possible to provide a brass-plated steel wire for reinforcing a rubber article, which is capable of improving the initial adhesiveness, heat-resistant adhesiveness and initial adhesion rate.

The invention claimed is:

1. A brass-plated steel wire for reinforcing a rubber article, wherein:
    when measured with XPS (X-ray photoelectron spectroscopy),
    an outermost surface contains zinc at an amount of 4.8 atom % or less, phosphorus at an amount of 0.5 atom % or more, and oxygen at an amount of 50.0 atom % or less; and
    in the outermost surface, an atomic ratio of copper to zinc is 1 to 6.

2. The brass-plated steel wire for reinforcing a rubber article according claim 1, containing a metal having an ionization tendency less than zinc and more than copper at an amount of 0.010 to 2.0 atom %.

3. A rubber composition for coating a brass-plated steel wire for reinforcing a rubber article according to claim 1, wherein
    an amount of cobalt is 0.1 parts by mass or less per 100 parts by mass of a rubber component of the rubber composition.

4. A tire comprising a brass-plated steel wire according to claim 1.

5. A tire comprising a brass-plated steel wire according to claim 2.

6. A tire comprising a composite of a brass-plated steel wire for reinforcing a rubber article comprising the rubber composition according to claim 3.

* * * * *